May 7, 1935.  J. G. SHODRON  2,000,102
APPARATUS FOR THE STORAGE OF HAY
Filed Nov. 18, 1932   3 Sheets-Sheet 1
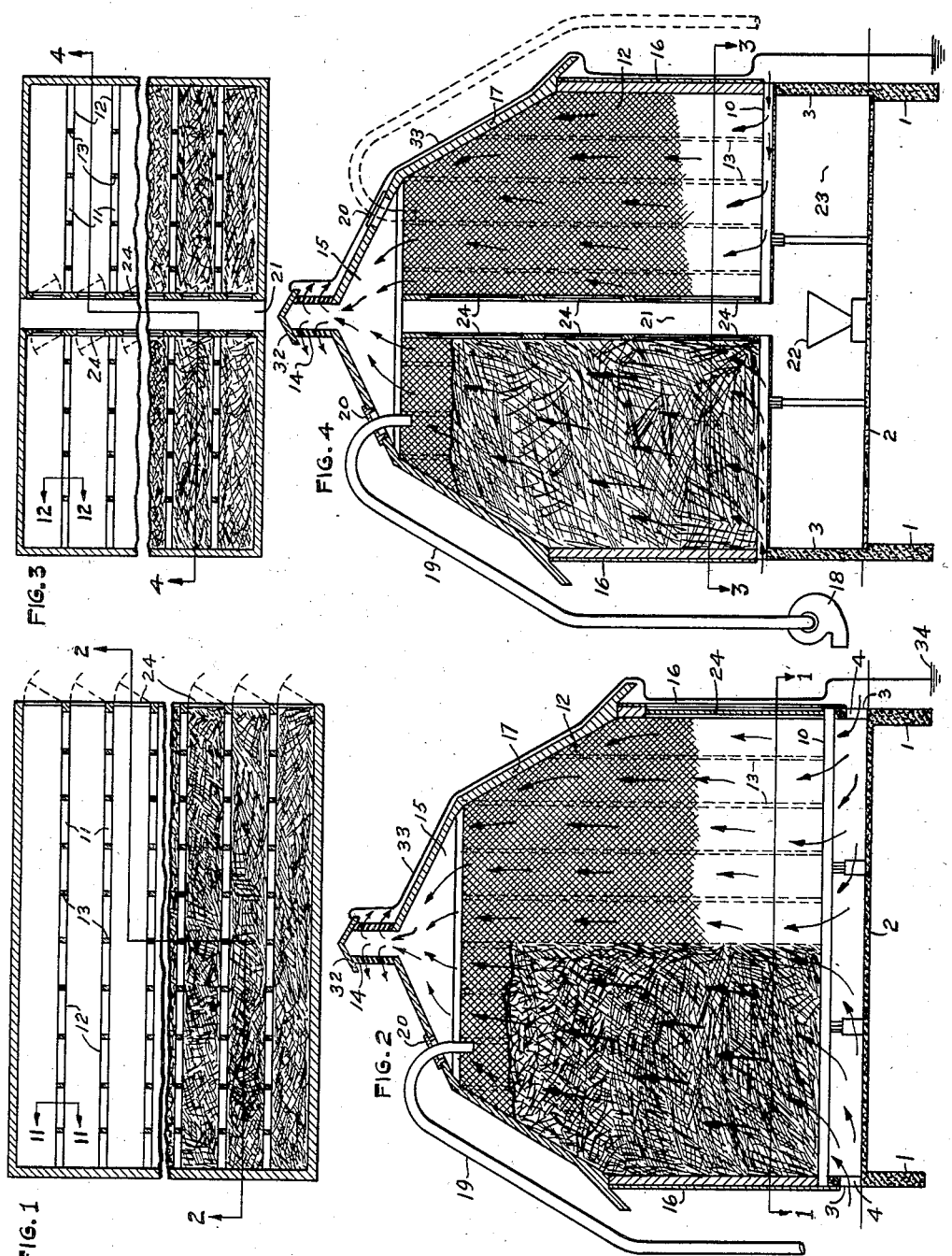
INVENTOR
JOHN G. SHODRON.
BY
ATTORNEYS May 7, 1935.  J. G. SHODRON  2,000,102
APPARATUS FOR THE STORAGE OF HAY
Filed Nov. 18, 1932  3 Sheets-Sheet 2
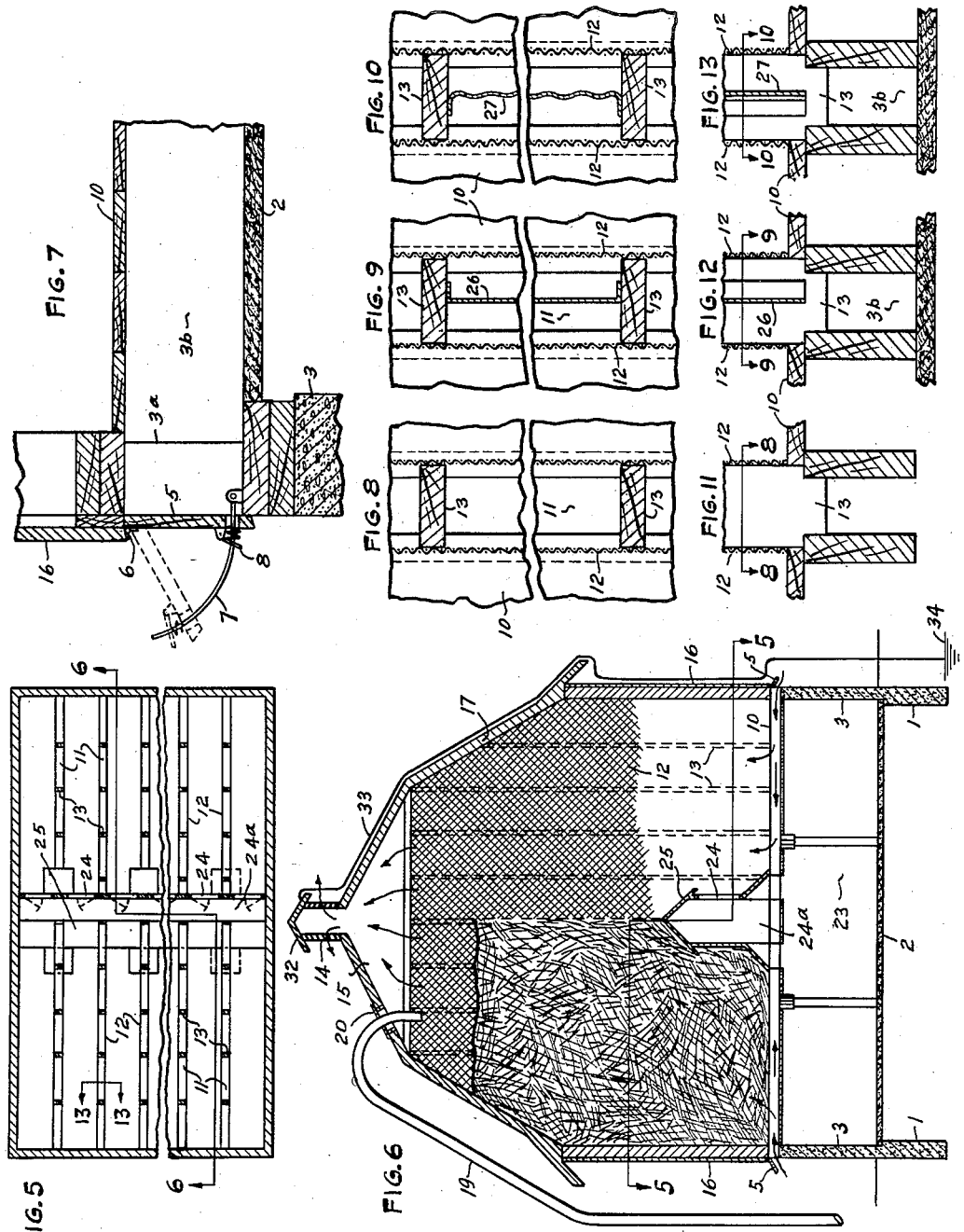
INVENTOR
JOHN G. SHODRON.
BY
ATTORNEYS

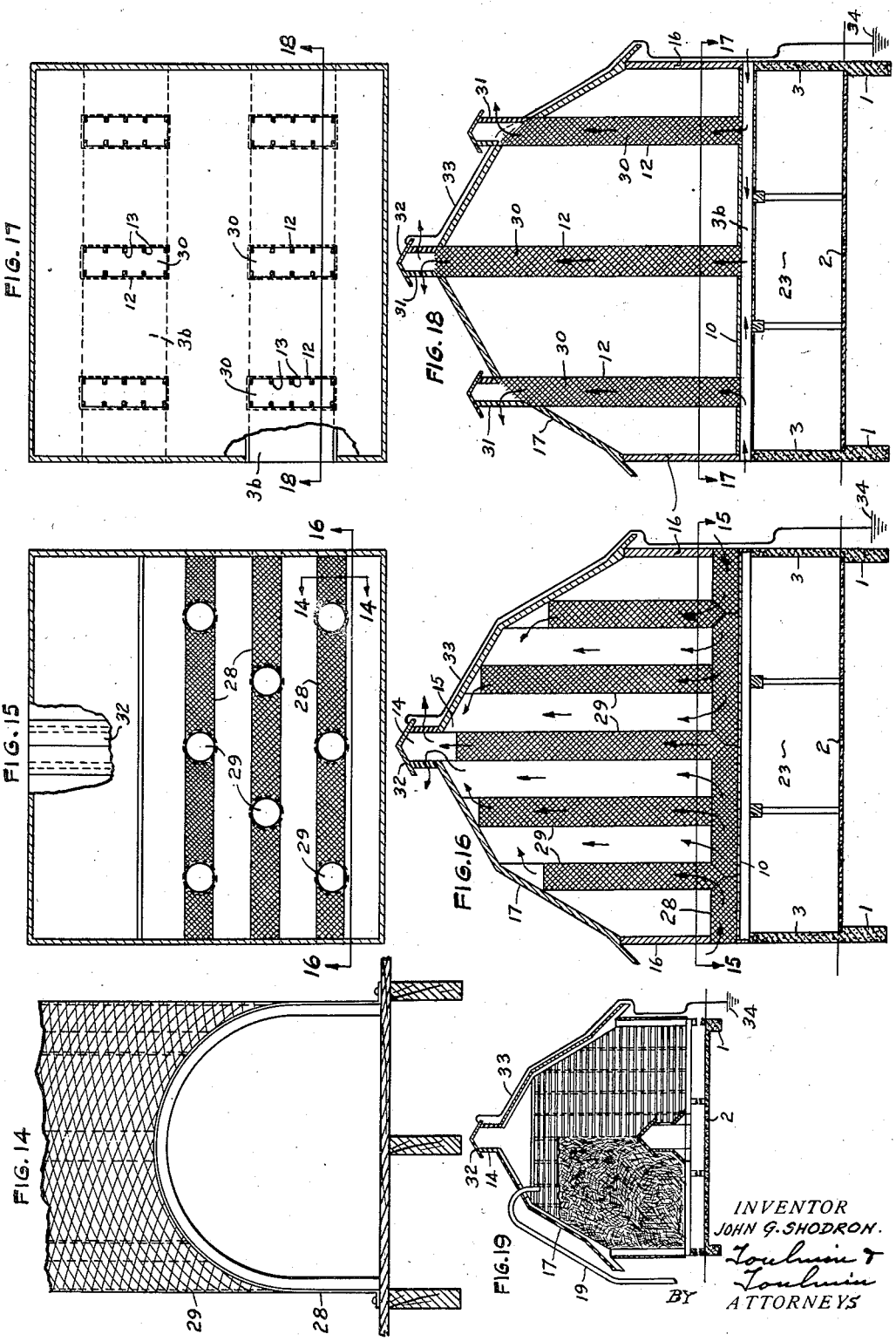

Patented May 7, 1935

2,000,102

UNITED STATES PATENT OFFICE 2,000,102

APPARATUS FOR THE STORAGE OF HAY

John G. Shodron, Fort Atkinson, Wis., assignor to James Manufacturing Company, Fort Atkinson, Wis., a corporation of Wisconsin Application November 18, 1932, Serial No. 643,232

3 Claims. (Cl. 98—54)

My invention relates to a method and apparatus for the storage of hay.

It is the object of my invention to provide storage compartments relatively deep and narrow of such dimensions that hay, preferably chopped hay, can be thoroughly and continuously ventilated to prevent spontaneous combustion and ignition of the hay.

In particular it is my object to provide means of storing hay in two-story barns, especially barns already constructed, so as to prevent ignition of the hay in such barns by spontaneous combustion or otherwise.

It is a further object of my invention to provide in connection therewith means of storing the hay, preferably chopped hay.

It is a further object of my invention to provide means of absorbing and radiating heat from the hay storage chambers so as to carry away that heat more rapidly.

It is an object of my invention to provide means for storing chopped hay which can be chopped immediately after being cut while it still has an unusually large moisture content, sometimes as high as 30 percent.

Heretofore the storage of hay in barns, particularly in barns having two-story hay lofts, has resulted in numerous fires due to spontaneous combustion or the ignition of the gases generated by the hay through lightning or other causes.

It is my object to provide metallic spacers for the hay which act as conductors for such currents and act as a safeguard from the ignition of the hay by static electricity or lightning.

Furthermore, in such two-story barns it has been necessary to have special hay handling equipment, such as hay forks, racks and slings. According to my invention the hay is chopped and brought in chopped condition into the separate compartments in the barn. It is thus possible to use existing barns which are not otherwise fireproof and to render them entirely safe by this method and apparatus for the storage of hay.

It is my object to provide a novel and ready means of removing the hay in sections while at the same time permitting of this continuous and thorough ventilation of the hay to prevent fire.

Referring to the drawings, Figure 1 is a section on the line 1—1 of Figure 2 showing the arrangement of the succession of spaced narrow vertically disposed ventilating hay chambers.

Figure 2 is a section on the line 2—2 of Figure 1.

Figure 3 is a similar view to Figure 1 but is a section on the line 3—3 of Figure 4.

Figure 4 is a section on the line 4—4 of Figure 3, showing in elevation the central feed discharge corridor or passageway and the feeding stable below.

Figure 5 is a section on the line 5—5 of Figure 6 showing a modified form of hay discharge passageway.

Figure 6 is a section on the line 6—6 of Figure 5.

Figure 7 is a detailed vertical section through an air ventilation passageway and the closure therefor.

Figure 8 is a transverse section on the line 8—8 of Figure 11 showing the arrangement of adjacent foraminous walls forming an air circulation passageway between the adjacent bodies of hay.

Figure 9 is a similar view with a straight metal air guide plate and radiation plate.

Figure 10 is a similar view with a corrugated radiation plate.

Figure 11 is a section on the line 11—11 of Figure 1.

Figure 12 is a section on the line 12—12 of Figure 3.

Figure 13 is a section on the line 13—13 of Figure 5.

Figure 14 is a detailed elevation of the bottom of one of the foraminous ventilation chutes shown in Figures 15, 16, 17 and 18 with the flooring partially in section, the view being taken on the line 14—14 of Figure 15.

Figure 15 is a section on the line 15—15 of Figure 16.

Figure 16 is a section on the line 16—16 of Figure 15 showing a plurality of vertically disposed and horizontally disposed spaced foraminous ventilation chutes.

Figure 17 is a section on the line 17—17 of Figure 18.

Figure 18 is a section on the line 18—18 of Figure 17.

Figure 19 is a vertical section through a modified form of my invention showing in particular the arrangement of the lightning rods in connection with the metal foraminous partitions.

Referring to the drawings in detail, 1 refers to the foundation walls of a barn having a floor 2. Mounted upon the floor 2 are supplementary side walls 3 having ports 4 which may be closed if desired by adjustable doors. A modified form is shown in Figure 7 where the foundation wall 1 has mounted a wooden floor 2 thereon. This floor has mounted upon it spaced wooden supports 3a having ports therebetween 3b, which are closed by the swinging door 5, and is hinged at 6 and adjusted on the locking rod 7 by the clamp 8.

It will be noted that a floor 10 is mounted on the side walls 3 or supports 3a, but this floor is spaced apart to form longitudinally disposed openings 11 through which the air passes upwardly and thence through the spaced foraminous walls, preferably of wire netting designated 12. These netting walls are carried on spaced upright studding members 13 that bridge the space 11 and rest upon the floor 10. The distance between the wire netting walls 12 between which the hay is retained is not greater than it will be possible for the air to fully and freely circulate through the hay contained therein. The air circulates from either or both sides and through the body of the hay upwardly and thence out through ventilation cupolas 14. The tops of these compartments which are relatively narrow, deep and long, open into the space 15 beneath the cupolas 14. There may be any number of the ventilation cupolas 14 desired.

It will be noted that the barn may have its side walls formed of any desired material, such as the side sheathing 16 which may be either wood, metal or cement. Supported on these side walls are the sides of the roof 17, which likewise may be made of any material desired. By having the hay completely and thoroughly ventilated, it is possible to carry away any combustible gases and to maintain the temperature of the hay at such a point that even though it is stored in these compartments when partially green, it will not heat to a point where it can catch fire. The hay is thus preserved and cured, retaining in its natural state much of the vitamines which would otherwise be lost, and by reason of being stored while in green condition, the vitamine bearing and protein bearing leaves are not shaken off, which is the case with a percentage of the leaves when the hay is completely dried in the field according to the present practice in the art. Before chopping I am enabled to gather it, allow it to dry a short period of time, collect it before evening and either while collecting the hay, chop it, or convey it to the barn and chop it at the barn, and then blow the chopped hay by a blower 18 through the delivery pipe 19 to each of the compartments between the wire walls 12.

The roof 17 is provided with a series of ports 20 for positioning the upper end of the delivery pipe for delivery of the chopped hay which is thus blown into the series of spaced narrow hay compartments. These compartments are filled one by one, or a plurality of pipes may be employed for simultaneously filling.

It will be noted that it is now possible by this arrangement to use existing barns, and by merely separating the hay compartment space with the spaced wire partitions, convert a hazardous barn structure into substantially the equivalent of a fireproof barn structure without employing fireproof material.

It will be further understood that while I have shown wire netting, any form of foraminous wall may be employed, such as spaced wooden members and the like.

It will be further noted that in the form shown in Figures 3 and 4, a central discharge passageway 21 is provided through which the hay may be discharged into the feed rack 22 in the barn space 23 below the hay mow. This is a convenient arrangement where the stock is fed below the hay mow.

Doors 24 are used for each hay compartment, through which hay can be discharged for this purpose.

When it is desired to have the hay mows extend completely the length of the barn, then a modified form of the hay chute as used in Figures 5 and 6 is indicated at 24a. This chute does not extend from top to bottom of the hay mow but only a short vertical distance, and it is provided with a roof 25.

Referring to the construction shown in Figures 9, 10, 12 and 13, it will be noted that between the studding 13 are vertical metal plates 26 and 27. If the hay in one compartment becomes hotter than in the other compartments, or both compartments become quite hot, the heat radiated through 12 will be absorbed by the radiation plates 26 or 27 and the upward draft of air through the space 11 will carry away the heat through the top of the cupola. This is an additional safeguard and at the same time such plates between the studding 13 gives it greater strength.

Referring to Figures 14, 15, 16, 17 and 18, the barn may be provided with a plurality of horizontally disposed air passageways having wire net walls, such as at 28, and communicating with these horizontally spaced air passageways on which the hay rests and through which the air can pass are a plurality of vertically disposed wire net passageways 29, all communicating with the space 15 and ventilator 14 under the roof 17 of the barn.

In the form shown in Figures 17 and 18, instead of the chutes being tubular, they are rectangular air chutes having vertical studding 13 supporting the wire netting 12 to form the rectangular ventilation chamber 30. Each of these chambers communicates with its own cupola or ventilation opening 31 in the roof 17. The bottoms of these chutes communicate with the horizontal air passageways 3b. Such a barn may or may not be provided with the feed compartment 23. The passageway 3b in this instance is a relatively long horizontally disposed shallow air passageway. There is one of these transversely arranged passageways to each series of vertically disposed ventilating tubes 30. The exact dimensions of these rectangular shaped ventilation passageways are matters of choice, but they should be relatively long and relatively narrow in order to provide the maximum surface ventilation for the hay bodies located between them. The distance through the hay should be substantially the same from any one of these ventilation chutes 30. In this way the hay is never of a depth or a thickness greater than that which can be conveniently ventilated and therefore the temperature of which can be suitably controlled.

Referring to Figure 19, in order to increase the fireproof nature of the structure, even though it is not of fireproof materials, I provide a sheet metal roof covering 32 on the cupola 14 and preferably a sheet metal roof on the roof 17. I attach to the sheet metal roof a copper wire 33 which extends from the cupola down the roof into the ground 34. If desired, this conductor may be connected to the metallic netting in order to form the maximum mass of metal for lightning protection.

It will be further observed that by using the type of roof noted, which converges inwardly and upwardly, the air passing through the chopped hay is guided gradually and effectively into the space 15 and thence out through the cupola 14.

In fact, this type of roof acts as a chimney, the ultimate constricted throat of which at the ventilator 14 serves to cooperate in producing the draft so as to insure a thorough ventilation of the hay masses.

It will be understood that I desire to comprehend within this invention such modifications as come within the scope of my claims and my invention.

Having thus fully described my invention, what I claim as new and desire to secure by Letters Patent, is:

1. In combination, in a barn, means of dividing the barn into a plurality of thin tall compartments with foraminous walls, said walls extending across the entire width of the barn, means of storing hay between said walls, means of introducing air between said columns of hay through the walls thereof for ventilating the hay columns, means enclosing the top of said columns for guiding the air from the hay upwardly and out the top thereof, means forming a central corridor between said hay columns into which hay can be discharged, and means below said hay columns for the enclosure of stock and the reception of feed to feed the stock, said barn being provided with a floor having openings for the introduction of air to the stored hay, said floor supporting the hay and also supporting said central corridor, said central corridor having a roof located a comparatively short distance above said floor, and a side opening for the removal of hay.

2. In a barn for storing hay, a barn enclosure, a floor having apertures therein vertically disposed closely adjacent spaced foraminous partitions arranged on each side of each aperture in the floor, and vertically disposed spaced studding bridging said apertures and supporting said partitions, and heat radiating plates vertically disposed and carried between said foraminous partitions on said studding to prevent the heat from passing through one partition and entering another partition.

3. In a barn for storing hay, a barn enclosure, a floor having apertures therein, vertically disposed closely adjacent spaced foraminous partitions arranged on each side of each aperture in the floor, and vertically disposed spaced studding bridging said apertures and supporting said partitions, and heat radiating means vertically disposed and carried between said foraminous partitions on said studding to prevent the heat from passing through one partition and entering another partition.

JOHN G. SHODRON.